Patented Apr. 28, 1936

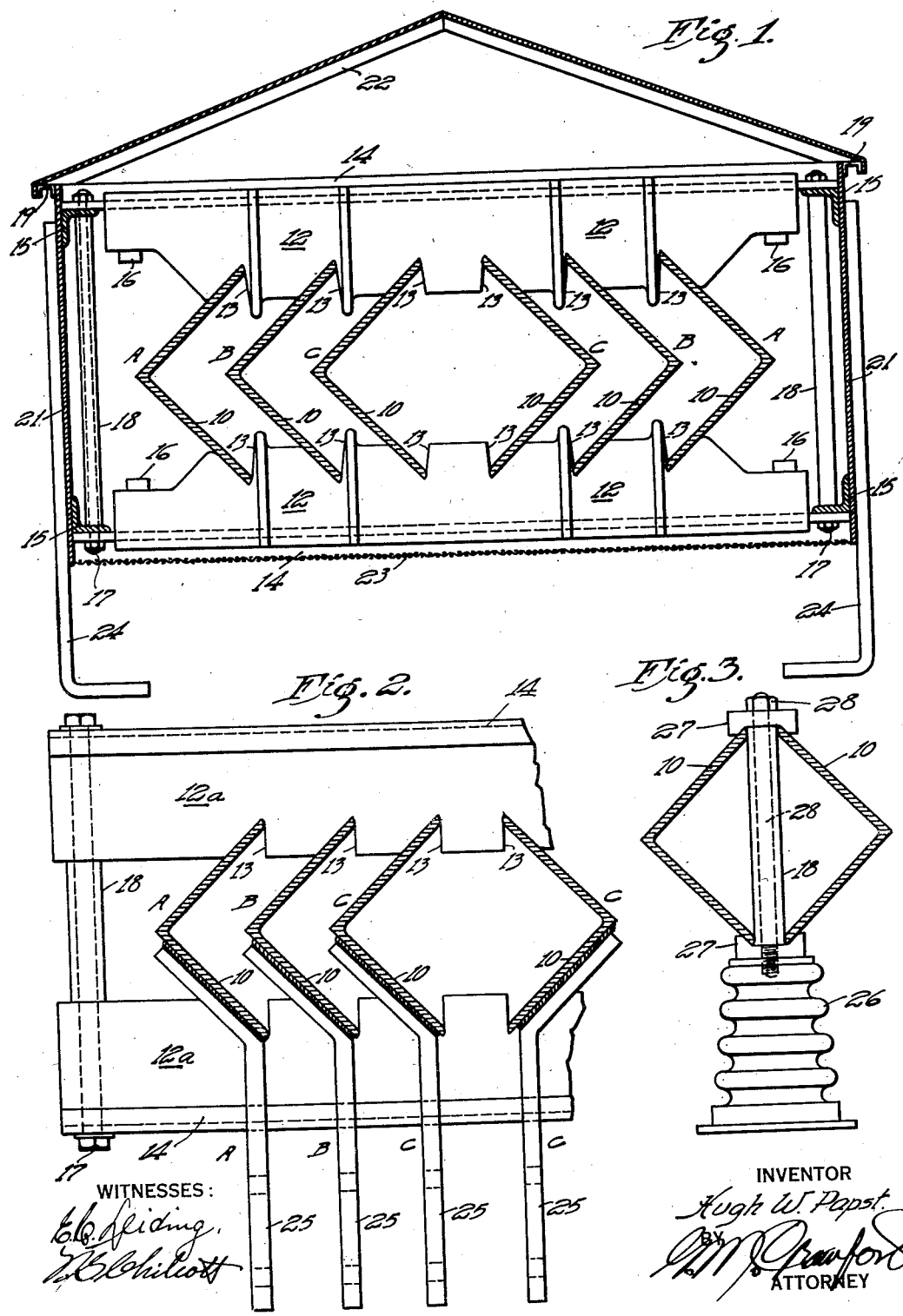

2,039,025

UNITED STATES PATENT OFFICE 2,039,025

ELECTRICAL CONDUCTOR

Hugh W. Papst, Pittsburgh, Pa., assignor to Westinghouse Electric & Manufacturing Company, East Pittsburgh, Pa., a corporation of Pennsylvania Application August 8, 1934, Serial No. 738,981

5 Claims. (Cl. 173—13)

My invention relates to electrical conductors and more particularly to bus bars for use in multi-phase power systems.

An object of my invention, generally stated, is to provide a bus bar structure which will be highly efficient in operation and which may be economically manufactured and installed.

A more specific object of my invention is to provide a simple and economical means of supporting a multiphase bus bar structure.

Another object of my invention is to provide a bus bar arrangement which shall have a low inductance.

It is known that tubular conductors will transmit alternating currents more efficiently than solid conductors because of the skin effect produced in a conductor carrying alternating current. In view of the difficulty of mounting tubular conductors, various schemes have been proposed in which either flat bars or channel bars are so mounted as to provide a "hollow square" arrangement having the desirable features of tubular conductors relative to current-carrying capacity.

However, where currents beyond the limits of an ordinary multiple-bar bus must be carried, it is advisable to utilize a form of interlaced construction in order to avoid excessive voltage drops caused by the circuit reactance. The methods of mounting bus bars heretofore proposed are not suitable for utilizing an interlaced arrangement of the conductors and, accordingly, I have devised the scheme herein disclosed, which has numerous advantages over previously known bus bar arrangements, as will be set forth hereinafter.

In accordance with the preferred embodiment of my invention, structural angle bar conductors are concentrically mounted in insulating supporting members and the succeeding phases of a multi-phase system are carried within the first phase.

For a fuller understanding of the nature and objects of my invention, reference may be had to the following detailed description, taken in conjunction with the accompanying drawing, in which:

Figure 1 is an end view, partially in elevation and partially in section, of a bus bar arrangement constructed in accordance with my invention;

Fig. 2 is a view, similar to Fig. 1, of a portion of a modified form of the bus bar structure, showing a method of making branch connections to the main bus bars, and Fig. 3 is a view partly in elevation and partly in section, of a modification of the invention, showing one pair of angle bars mounted to form a single conductor.

Referring to the drawing, and particularly to Fig. 1, the bus bar structure shown comprises a plurality of angle bars 10, which may be composed of any suitable conducting material such as copper or aluminum. As shown, the angle bars 10 are disposed in spaced relation with the corresponding legs of the bars substantially at right angles to each other, the bars being mounted obliquely so that the vertices of the angles are in a substantially horizontal plane, thereby providing vertically opposed ventilation openings between the bars, which permits a free circulation of air between the conductors, resulting in higher current ratings per unit of conductor.

If it is desired to provide only a single conductor, one pair of angle bars may be mounted in a manner similar to that of the inside pair of bars in Fig. 1, designated by the letter C, or the conductors may be mounted as shown in Fig. 3, thereby forming a hollow divided conductor of rectangular cross section and having vertically opposed ventilation openings which provides an improved ventilating scheme, the air being allowed to pass through the conductor vertically from the bottom to the top of the conductor.

For multi-phase power systems, as for example, a three-phase system, the conductors may be arranged in the manner shown in Figs. 1 and 2, in which a pair of angle bars is provided for each phase and the pairs of angle bars are concentrically mounted with the vertices of all the angles disposed in a horizontal plane. Thus, the inner pair of conductors marked C may be connected to phase C of the power system, the next outer pair of conductors marked B may be connected to phase B and the outermost conductors marked A to phase A of the power system. By thus concentrically mounting the conductors for all three phases, with each successive phase disposed within the first, the inductance of the bus bar arrangement is greatly reduced and, accordingly, the reactance voltage drop of the system is reduced.

Furthermore, the amount of space required for a multi-phase bus bar structure may be reduced considerably by arranging the conductors in the manner herein shown and described; also the conductors may be supported in a simple and inexpensive manner.

In the structure shown in Fig. 1, the angle bars 10 are retained in spaced relationship by insulating members 12, which are similar in design, disposed at the top and also at the bottom of the conductors. Each insulating member 12 is provided with six notches 13 for receiving the tips of the legs of the angle bars 10. The insulators 12 are mounted on transversely disposed channel bars 14 which are secured to longitudinally disposed angle bars 15 at the four corners of the bus bar structure, the angle bars 15 being parallel to the bus bar conductors 10 and extending practically the full length of the bus bar structure.

The insulators 12 may be secured to the channel bars 14 by means of bolts 16 and the channel bars 14 are secured to the angle bars 15 by through bolts 17. Spacing sleeves 18 are provided on the bolts 17 to prevent the insulating members 12 from being drawn too tightly against the angle bar conductors. This construction permits the conductors to move freely in a lengthwise direction as the result of any expansion or contraction that might take place, thereby preventing warping or buckling of the conductors.

It will be understood that the combined insulating and supporting members may be placed along the bus bar structure at desired intervals to retain the conductors 10 in definite spaced relationship. It will also be understood that the structure shown is largely self supporting, the conductors 10 serving to strengthen the structure.

The bus bar structure shown in Fig. 1 is designed for outdoor service and is enclosed for protection from the elements and also from contact by persons or animals. The enclosing structure comprises sheet metal side members 21, which may be attached to the angle bars 15 and a cover structure 22, which may be secured at the upper edges of the side plates 21 by means of U-shaped members 19, provided at desired intervals. A metal screen 23 may be provided along the bottom of the bus bar structure, thereby affording protection from contact with the conductors but permitting a free circulation of air between them. The air is permitted to enter the enclosure through the screen and pass out through the spaces provided between the cover 22 and the top of the side plates 21, after vertically traversing the bus bar phases to effectively ventilate them. In this manner an enclosure may be provided which is entirely supported by the bus bar structure.

Supporting members 24 may be attached to the sides of the bus bar structure, at desired intervals, to mount the structure on pillars or a wall (not shown), thereby providing all the supporting means required for mounting the bus bar structure in any location.

The bus bar structure shown in Fig. 2 is designed for indoor service, therefore a cover structure is not required. However, the conductors may be enclosed by a metal screen, similar to the screen 23, if desired, to prevent persons from coming in contact with the conductors. The structure shown in Fig. 2 comprises a plurality of angle bars 10 disposed in the same manner as in Fig. 1. The conductors 10 are retained in spaced relationship by insulating members 12a, which may be of a slightly different design than those shown in Fig. 1. The insulators 12a are mounted in transverse channel bars 14 disposed above and below the conductors 10. The upper and lower insulating members 12a are drawn together to engage the angle bars 10 by means of through bolts 17. However, as in Fig. 1, spacing sleeves 18 are placed between the insulators to prevent the insulators from clamping the conductors too tightly, thereby permitting longitudinal movement of the conductors.

As shown, branch or feeder connections may be readily made to the main bus bars by means of conductors 25, which may be welded to the angle bars, or secured thereto in any other suitable manner.

In the modification of the invention shown in Fig. 3, a pair of angle bars 10 are so mounted on insulating supports or pillars 26 that they form a hollow divided conductor of rectangular cross section. The angle bars are mounted obliquely with the vertices of the angles disposed in a horizontal plane, as in the other forms of the invention and the bars are retained in spaced relationship by recessed clamps 27, which engage the tips of the legs of the angle bars. A centrally disposed stud bolt 28 serves to draw the top and bottom clamps 27 together, a spacing sleeve 18 being provided to prevent the angle bars from being clamped so tightly that they cannot expand longitudinally without buckling. The combined insulating and clamping means shown may be installed at desired intervals along the bus bar to support the angle bar conductor, thereby providing an inexpensive and efficient bus bar structure.

From the foregoing description, it is apparent that I have provided a bus bar structure which has numerous advantages over previously known structures. Some of the advantages of the invention are; the reduced space required for a multi-phase bus structure and the low inductance of the arrangement, which results in a low reactance voltage drop and improved power-factor conditions in alternating-current systems. The present structure also provides a better self-ventilating arrangement, which permits higher current ratings for the conductors.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A multi-phase bus bar structure comprising a plurality of pairs of angle bars concentrically mounted with the corresponding legs of each pair of bars disposed substantially at right angles to each other, the vertices of the angle bars being in a substantially horizontal plane, and combined insulating and supporting means for retaining the angle bars in spaced relationship to provide vertically opposed ventilation openings between the angle bars, each successive phase of the structure being disposed within the preceding phase.

2. A multi-phase bus bar structure comprising a pair of angle bars for each phase, said pairs of angle bars being concentrically mounted with the corresponding legs of each pair of bars disposed at substantially right angles to each other, the vertices of the angle bars being in a substantially horizontal plane, and combined insulating and supporting means for retaining the angle bars in spaced relationship to provide vertically opposed ventilation openings between the angle bars.

3. A multi-phase bus bar structure comprising a pair of angle bar conductors for each phase, said pairs of angle bars being concentrically mounted with the corresponding legs of each pair of bars disposed substantially at right angles to each other, the vertices of the angle bars being in a substantially horizontal plane and the conductors for each successive phase being disposed within the first phase, and means for retaining the bars in definite spaced relationship.

4. A multi-phase bus bar structure comprising a pair of L-shaped conductors for each phase, said pairs of conductors being concentrically mounted with the conductors for each successive phase being disposed within the first phase, and combined insulating and supporting means for retaining the conductors in definitely spaced relationship.

5. A three-phase bus bar structure comprising three pairs of angle bar conductors, one pair for each phase, said pairs of angle bars being concentrically mounted with the conductors for each successive phase disposed within the first phase, the vertices of the angle bars being in a substantially horizontal plane, and insulating means for engaging the ends of the legs of the angle bars to support said bars.

HUGH W. PAPST.